(12) United States Patent
Darabi

(10) Patent No.: US 7,965,994 B2
(45) Date of Patent: Jun. 21, 2011

(54) METHOD AND SYSTEM FOR AN ANALOG ZERO-IF INTERFACE FOR GSM RECEIVERS

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 601 days.

(21) Appl. No.: 10/976,666

(22) Filed: Oct. 29, 2004

(65) Prior Publication Data

US 2006/0094391 A1 May 4, 2006

(51) Int. Cl.
*H04B 1/10* (2006.01)

(52) U.S. Cl. ........ 455/296; 455/208; 455/318; 455/324; 455/339

(58) Field of Classification Search .................. 455/208, 455/318, 324
See application file for complete search history.

(56) References Cited

U.S. PATENT DOCUMENTS

| | | | | |
|---|---|---|---|---|
| 5,802,463 | A * | 9/1998 | Zuckerman | 455/208 |
| 6,600,911 | B1 * | 7/2003 | Morishige et al. | 455/307 |
| 6,725,029 | B1 * | 4/2004 | Allen | 455/302 |
| 6,759,887 | B2 * | 7/2004 | Takahashi et al. | 327/359 |
| 7,136,431 | B2 * | 11/2006 | Shi et al. | 375/319 |
| 7,187,917 | B2 * | 3/2007 | Lin et al. | 455/323 |
| 7,251,298 | B1 * | 7/2007 | Hietala et al. | 375/340 |
| 7,277,688 | B2 * | 10/2007 | Yang et al. | 455/296 |
| 7,321,754 | B2 * | 1/2008 | Zellweger et al. | 455/307 |
| 7,593,491 | B1 * | 9/2009 | Khlat et al. | 375/344 |
| 7,593,707 | B2 * | 9/2009 | Ibrahim et al. | 455/260 |
| 7,773,965 | B1 * | 8/2010 | Van Brunt et al. | 455/226.1 |
| 7,840,202 | B2 * | 11/2010 | Ibrahim et al. | 455/260 |
| 2003/0104799 | A1 * | 6/2003 | Hayek et al. | 455/324 |
| 2003/0174641 | A1 * | 9/2003 | Rahman | 370/206 |
| 2006/0105735 | A1 * | 5/2006 | Ibrahim et al. | 455/324 |
| 2007/0112904 | A1 | 5/2007 | Kasperkovitz | |

* cited by examiner

*Primary Examiner* — Nay Maung
*Assistant Examiner* — Richard Chan
(74) *Attorney, Agent, or Firm* — McAndrews, Held & Malloy, Ltd.

(57) ABSTRACT

Certain embodiments for an analog zero-IF interface for GSM receivers, where a receiver may receive RF signals and downconvert the RF signal to a VLIF signal in the analog domain. The VLIF signal may be further downconverted to a baseband signal in the analog domain. The baseband signal may be an analog signal. Aspects of the invention may comprise amplifying the received RF signal, mixing the amplified RF signal down to a VLIF signal, filtering the VLIF signal, amplifying the VLIF signal, mixing the filtered VLIF signal to a baseband signal, and filtering the baseband signal. The local oscillator signal to the mixer that may downconvert the RF signal to a VLIF signal may be an output of a programmable local oscillator, and may be one of a plurality of frequencies. The mixer that generates the baseband signal may be a harmonic-reject mixer.

24 Claims, 4 Drawing Sheets

METHOD AND SYSTEM FOR AN ANALOG ZERO-IF INTERFACE FOR GSM RECEIVERS

CROSS-REFERENCE TO RELATED APPLICATIONS/INCORPORATION BY REFERENCE

Related Applications

This application is related to the following applications, each of which is incorporated herein by reference in its entirety for all purposes:
U.S. patent application Ser. No. 10/976,976 filed Oct. 29, 2004;
U.S. patent application Ser. No. 10/976,977 filed Oct. 29, 2004;
U.S. patent application Ser. No. 10/977,000 filed Oct. 29, 2004;
U.S. patent application Ser. No. 10/976 575 filed Oct. 29. 2004;
U.S. patent application Ser. No. 10/977,464 filed Oct. 29, 2004;
U.S. patent application Ser. No. 10/977,798 filed Oct. 29, 2004;
U.S. patent application Ser. No. 10/977,005 filed Oct. 29, 2004;
U.S. patent application Ser. No. 10/977,771 filed Oct. 29, 2004;
U.S. patent application Ser. No. 10/977,868 filed Oct. 29, 2004;
U.S. patent application Ser. No. 10/977,631 filed Oct. 29, 2004;
U.S. patent application Ser. No. 10/976,639 filed Oct. 29, 2004;
U.S. patent application Ser. No. 10/977,210 filed Oct. 29, 2004;
U.S. patent application Ser. No. 10/977,872 filed Oct. 29, 2004;
U.S. patent application Ser. No. 10/977,869 filed Oct. 29, 2004;
U.S. patent application Ser. No. 10/977,874 filed Oct. 29, 2004; and
U.S. patent application Ser. No. 10/976,996 filed Oct. 29, 2004, 2004.

FIELD OF THE INVENTION

Certain embodiments of the invention relate to receiving RF signals. More specifically, certain embodiments of the invention relate to a method and system for an analog zero-IF interface for GSM receivers.

BACKGROUND OF THE INVENTION

In some conventional systems, a radio frequency (RF) signal may be converted to an intermediate frequency (IF), and then from IF to a baseband signal, where the IF may be in the megahertz range. Generally, the RF signal may be mixed with a local oscillator signal that results in two sideband signals that are the sum of the frequencies of the two signals and the difference of the frequencies of the two signals. One of the two sideband signals may be chosen as an IF signal, and this IF signal may be the same for all received RF signals. Therefore, a radio that may receive a plurality of channels, such as an AM or FM radio, may tune to a particular station by changing the local oscillator signal frequency such that the IF remains constant. With a constant IF, most of the receive path may be common in the receiver.

Today, much of radio receiver development may be driven mostly by a great demand for mobile wireless communication devices, including handsets. With the ever-decreasing size of mobile handsets, capacities of smaller batteries may be an issue. As most of these handsets may use complementary metal-oxide semiconductor (CMOS) technology for analog to digital conversion, and for much of the processing of voice and data signals, a very important factor to consider may be that it may be advantageous for CMOS devices work at lower frequencies. This may be crucial since CMOS devices have power dissipation directly related to the speed at which the CMOS devices switch. The faster the frequencies, the faster the CMOS device switching speed, and therefore, the greater the amount of power consumed. Therefore, receivers may be designed to downconvert the high frequency RF, which may be in gigahertz range, to a lower frequency, preferably to a baseband frequency, as quickly as possible.

As a result, some receivers may utilize chips for digitally processing baseband signals, and may expect to receive the baseband signal, rather than an IF signal. To meet this need, some receiver architectures, for example, direct-conversion receivers, try to do away with IF by converting directly from RF to baseband, and therefore reduce power consumption by not processing IF signals, and cost by not having to deal with IF signals. However, with direct conversion, the reduced power consumption may be offset by strong drawbacks, such as DC-offset generation, 1/f noise, I/Q mismatch, excessive flicker noise in the baseband, and local oscillator (LO) leakage. In addition, a digital signal processor (DSP) may be required to perform complex digital processing of the digital signal for filtering and downconverting from the RF frequency.

If a measured signal-to-noise ratio (SNR) is less than a desired SNR, the DSP may need to perform, for example, distortion cancellation or other SNR reduction or mitigation function. Additionally, during direct conversion a majority of gain and filtering may be performed in a frequency band from DC to the signal bandwidth. In this process, a signal path's intrinsic DC offsets may be amplified. The dynamic range of the circuit may thereby be degraded. In addition, a DC offset may be created if the LO signal leaks to the RF front end and self-mixes. Since GSM systems may use modulation and system synchronization techniques that require DC information, it may not be feasible to simply remove the DC component. Rather, complex DSP processing may be required to reduce the DC offset while still keeping the information present in the DC signal.

Although direct conversion receivers may try to reduce parts count and try to reduce power consumption, additional complex digital signal processing, and its accompanying cost, may be required. Simply reducing component count as with direct conversion, because system design complexity may increase, as well as cost, may not be the desired route. Furthermore, the digital baseband signal may have to be converted to an analog signal for some baseband processors.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for an analog zero-IF interface for GSM receivers.

Aspects of the method may comprise downconverting an RF signal to a VLIF signal via a mixer, and downconverting the VLIF signal to a baseband signal utilizing a harmonic-reject mixer. Both downconverting operations may occur in the analog domain. The RF signal may be amplified by a first amplifier, and the first amplifier may be a fixed gain amplifier or a variable gain amplifier.

A first local oscillator signal may be generated by a first local oscillator circuit and provided as an input to the mixer. The amplified RF signal may also be provided as an input to the mixer and the VLIF signal may be a generated output of the mixer. The first local oscillator circuit may be adapted to produce the first local oscillator signal that comprises a fixed frequency. In one aspect of the invention, the first local oscillator circuit may comprise a programmable VLIF oscillator circuit. A frequency of the first local oscillator signal may be one of a plurality of frequencies that is produced by the programmable VLIF oscillator circuit.

The VLIF signal may be filtered by a bandpass filter to attenuate undesired signals from the VLIF signal, and this signal may be amplified by a second amplifier. The second amplifier may be a fixed gain amplifier or a variable gain amplifier. The amplified VLIF signal may be provided as an input to a harmonic-reject mixer, and a second local oscillator circuit may be adapted to generate a second local oscillator signal that may also be an input to the harmonic-reject mixer. The output of the harmonic-reject mixer may be an unfiltered baseband signal.

The second local oscillator circuit output may be a fixed frequency or the second local oscillator circuit may be a programmable local oscillator and a frequency of the second local oscillator signal may be one of a plurality of frequencies. The unfiltered baseband signal may be filtered by a lowpass filter and an output of the lowpass filter is the baseband signal.

Aspects of the system may comprise a mixer that may be adapted to downconvert an RF signal to a VLIF signal and a harmonic-reject mixer to downconvert the VLIF signal to a baseband. Both downconverting operations may occur in the analog domain. The system may further comprise a first amplifier, which may be utilized to amplify the RF signal, and the first amplifier may be a fixed gain amplifier or a variable gain amplifier.

The system may also comprise a first local oscillator circuit that may be utilized to generate a first local oscillator signal that is intended as an input to the mixer. The amplified RF signal may also be provided as an input to the mixer and the VLIF signal may be generated as an output of the mixer. The first local oscillator circuit may produce a first local oscillator signal that has a fixed frequency. The first local oscillator circuit may comprise a programmable local oscillator circuit that produces the first local oscillator signal, which comprises one of a plurality of frequencies.

The system may further comprise a bandpass filter that may be adapted to filter the VLIF signal to attenuate undesired signals from the VLIF signal, and a second amplifier may amplify the bandpass filtered VLIF signal, where the second amplifier may be a fixed gain amplifier or a variable gain amplifier. A second local oscillator circuit may be utilized to generate a second local oscillator signal that may function as an input to the harmonic-reject mixer, and the amplified VLIF signal may also function as an input to the harmonic-reject mixer. The harmonic-reject mixer may be adapted to generate an unfiltered baseband signal at its output.

The second local oscillator circuit may be adapted to generate the second local oscillator signal with a fixed frequency. The second local oscillator circuit may be a programmable local oscillator, and in this regard, the second local oscillator signal may comprise one of a plurality of frequencies. A lowpass filter may be adapted to filter the unfiltered baseband signal and provide the baseband signal at its output.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in an analog zero-IF interface for GSM receivers. Various aspects of the invention may be utilized in a GSM receiver, which may be adapted to receive RF signals and downconvert the received RF signals to a VLIF signal. The VLIF signal may be further downconverted to a baseband signal. Aspects of the invention may comprise amplifying the received RF signal, mixing the amplified RF signal down to a VLIF signal, filtering the VLIF signal, amplifying the VLIF signal, mixing the filtered VLIF signal to a baseband signal, and filtering the baseband signal.

Figure 1B:
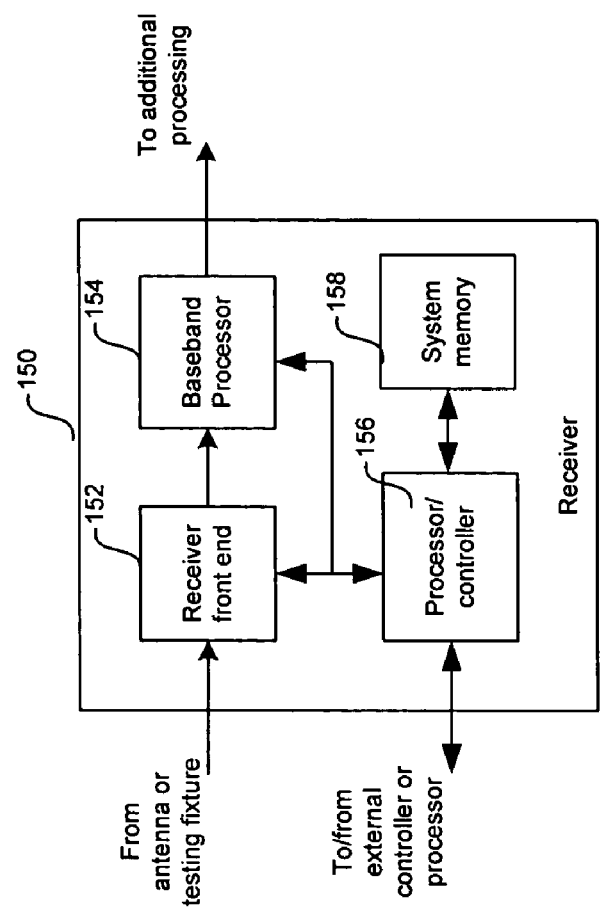
FIG. 1b is a block diagram of an exemplary RF receiver system, in accordance with an embodiment of the invention.
Figure 1A:
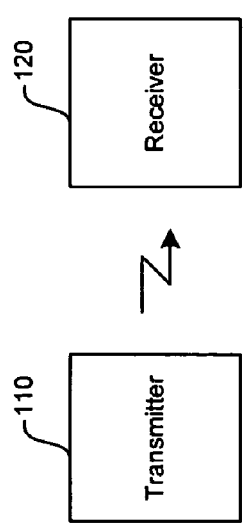
FIG. 1a is a block diagram of an exemplary transmitter system and a receiver system.

FIG. 1a is a block diagram of an exemplary transmitter system and a receiver system. Referring to FIG. 1a, there is shown a transmitter block 110 and a receiver block 120. The transmitter block 110 may comprise suitable logic, circuitry, and/or code that may be adapted to filter and modulate a baseband signal to an RF signal, and transmit the RF signal. The receiver block 120 may comprise suitable logic, circuitry, and/or code that may be adapted to demodulate the RF signal to the baseband signal.

In operation, the transmission block 110 may be adapted to transmit RF signals over a wired or wireless medium. The receiver block 120 may be adapted to receive the RF signals and process it to a baseband signal that may be suitable for further processing, for example, as data or voice.

FIG. 1b is a block diagram of an exemplary RF receiver system, in accordance with an embodiment of the invention. Referring to FIG. 1b, the RF receiver system 150 may comprise a receiver front end 152, a baseband processor 154, a controller/processor 156, and a system memory 158. The receiver front end 152 may comprise suitable logic, circuitry, and/or code that may be adapted to receive an RF signal. The receiver front end 152 may be coupled to an external antenna for signal reception. The receiver front end 152 may demodulate a received signal before further processing. Moreover, the receiver front end 152 may comprise other functions, for example, filtering the received signal, amplifying the received signal, and/or downconverting the received signal to very low intermediate frequency (VLIF) signal and/or baseband signal. The receiver front end 152 may comprise a IF processor which may digitize an IF signal, and digitally process the digitized IF signal to filter and/or downconvert the digitized IF signal to a digital baseband signal. The IF processor may then convert the digitized baseband signal to an analog baseband signal.

The baseband processor 154 may comprise suitable logic, circuitry, and/or code that may be adapted to process received baseband signals from the receiver front end 152. The controller/processor 156 may comprise suitable logic, circuitry, and/or code that may be adapted to control the operations of the receiver front end 152 and/or the baseband processor 154. For example, the controller/processor 156 may be utilized to update and/or modify programmable parameters and/or values in a plurality of components, devices, and/or processing elements in the receiver front end 152 and/or the baseband processor 154. Control and/or data information may be transferred from at least one controller and/or processor external to the RF receiver system 100 (FIG. 1a) to the controller/processor 156. Similarly, the controller/processor 156 may transfer control and/or data information to at least one controller and/or processor external to the RF receiver system 100.

The controller/processor 156 may utilize the received control and/or data information to determine the mode of operation of the receiver front end 152. For example, the controller/processor 156 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the controller/processor 156. This information stored in system memory 158 may be transferred to the receiver front end 152 from the system memory 158 via the controller/processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2:
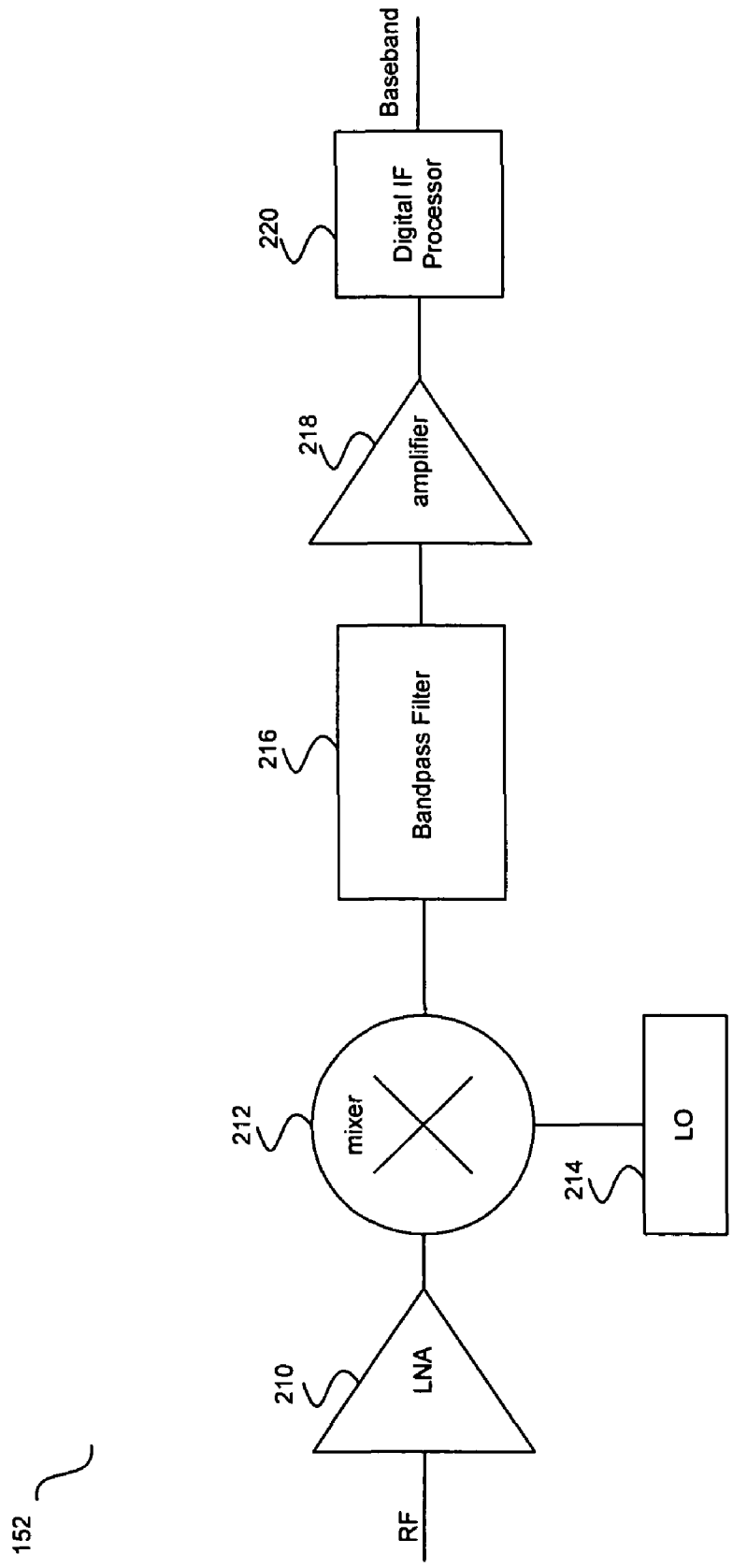
FIG. 2 is a block diagram illustrating an exemplary RF receiver front end using a digital IF processor to extract a baseband signal.

FIG. 2 is a block diagram illustrating an exemplary RF receiver front end using a digital IF processor to extract a baseband signal. Referring to FIG. 2, there is shown amplifiers 210 and 218, a mixer 212, an intermediate frequency local oscillator (IF LO) 214, a bandpass filter 216, and a digital IF processor (DIP) 220. The amplifiers 210 and 218 may comprise suitable logic, circuitry, and/or code that may be adapted to amplify input signals and output the amplified signals. The amplifier 210 and/or the amplifier 218 may be a low noise amplifier (LNA). A LNA may be utilized in instances where the signal to noise ratio (SNR) may be relatively low, such as, for example, RF signals received by an antenna. The amplifiers 210 and 218 may also be variable gain amplifiers, where the gain control may be under a programmable control of a processor/controller 156 (FIG. 1b).

The mixer 212 may comprise suitable logic, circuitry, and/or code that may be adapted to have as inputs two signals, and generate an output signal, which may be a difference of the frequencies of the two input signals and/or a sum of the frequencies of the two input signals.

The IF LO 214 may comprise suitable logic, circuitry, and/or code that may be adapted to output a signal of a specific frequency, either preset or variable under external control, where the external control may be a voltage. The latter type may be referred to as a voltage controlled oscillator (VCO). A VCO control voltage may be under programmable control of a processor/controller 156 (FIG. 1b).

The bandpass filter 216 may comprise suitable logic, circuitry, and/or code that may be adapted to selectively pass signals within a certain bandwidth while attenuating signals outside that bandwidth.

The DIP 220 may comprise suitable logic, circuitry, and/or code that may be adapted to digitize the IF signal, digitally process the digitized IF signal to filter and downconvert to generate a digital baseband signal, and convert the digital baseband signal to an analog baseband signal suitable for processing by the baseband processor 154 (FIG. 1b). An analog to digital converter (ADC) may be utilized to digitize the analog IF signal. The downconversion of the digital IF signal to the digital baseband signal may utilize decimation filters where the input frequency of the decimation filter may be a multiple of the output frequency of the decimation filter. The digital filtering of the digital samples may utilize a derotator that may utilize a coordinate rotation digital calculation (CORDIC) algorithm. The DIP 220 may convert the filtered, downconverted digital baseband signal to analog utilizing a digital to analog converter (DAC).

In operation, the RF signal, which may have a carrier frequency referred to as $f_{RF}$, may be received by an antenna and communicated to the amplifier 210, where the RF signal may be amplified by the amplifier 210. The amplified RF signal may be communicated to an input of the mixer 212. The output signal of the LO 214, which may have a frequency of $f_{LO}=f_{RF}+f_{IF}$ or $f_{LO}=f_{RF}-f_{IF}$, may be communicated to another input of the mixer 212, where $f_{IF}$ may be a desired intermediate frequency. The mixer 212 may process the two input signals such that the output signal may have a frequency, which may be a sum and/or a difference of the frequencies of the two input signals. The mixer 212 output signal may be referred to as an IF signal.

The IF signal may be communicated to a bandpass filter 216, which may be adapted to pass the desired bandwidth of signals about the IF frequency $f_{IF}$, while attenuating the undesired frequencies in the IF signal. The filtered IF signal may be communicated to a digital IF processor 220 where the filtered IF signal may be converted to digital signals via the ADC. The resulting digital signal may be digitally downconverted to the desired frequency, and then digitally filtered to remove abstracts of the digital downconversion process. The downconverted and filtered digital signal may be converted back to an analog signal via the DAC, and this analog signal may be the analog baseband output of the baseband processor 154.

Figure 3:
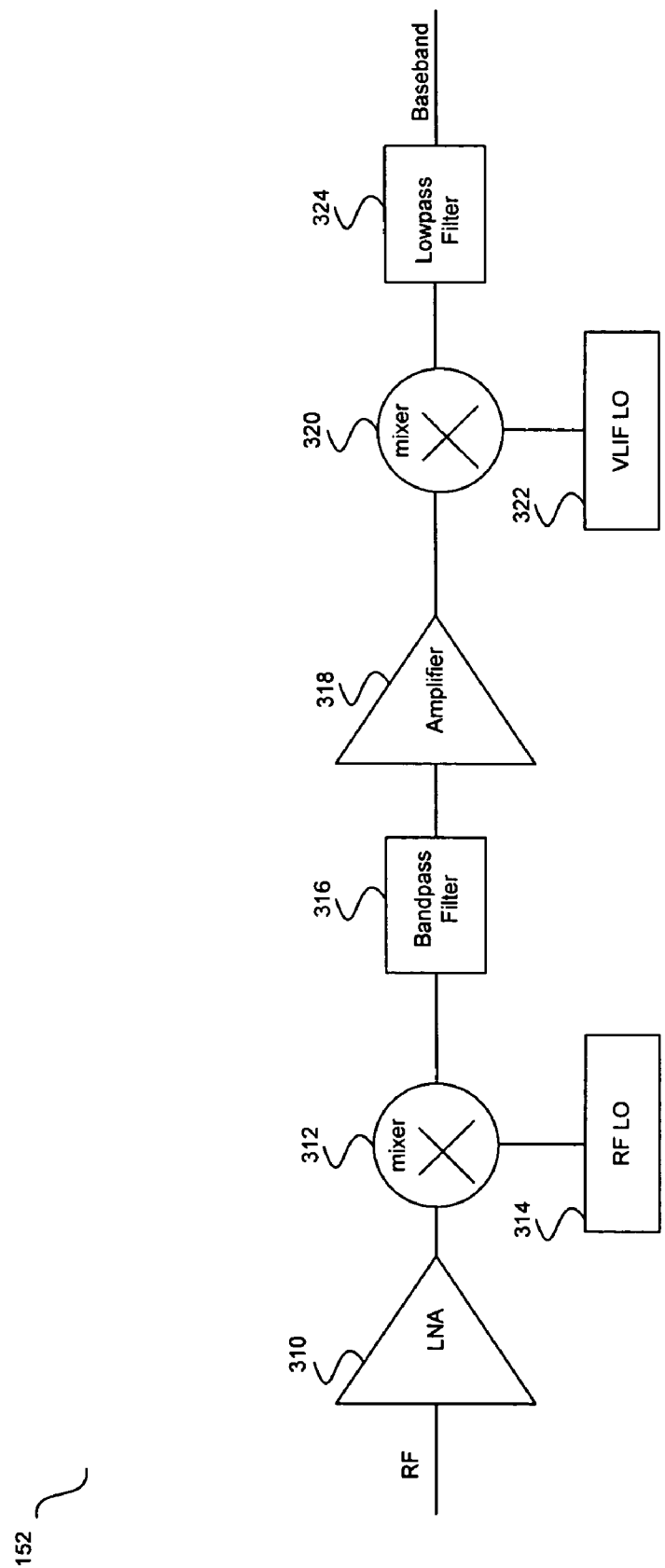
FIG. 3 is a block diagram illustrating an exemplary RF receiver front end, which may be utilized to extract a baseband signal from an RF signal, in accordance with an embodiment of the invention.

FIG. 3 is a block diagram illustrating an exemplary RF receiver front end, which may be utilized to extract a baseband signal from an RF signal, in accordance with an embodiment of the invention. Referring to FIG. 3, there is shown amplifiers 310 and 318, mixers 312 and 320, radio frequency local oscillator (RF LO) 314 and a very low intermediate frequency local oscillator (VLIF LO) 322, bandpass filter 316 and a lowpass filter 324. The amplifiers 310 and 318, RF LO 314 and VLIF LO 322, and the bandpass filter 316 may be similar to the amplifiers 210 and 218, the LO 214, and the bandpass filter 216, respectively, described in FIG. 2. The mixers 312 and 320 may be similar to the mixer 212 described in FIG. 2, however, the mixer 320 may be a harmonic reject mixer (HRM). In addition to mixing signals, the HRM may also remove odd harmonics of the baseband signal. The lowpass filter 324 may comprise suitable logic, circuitry, and/or code that may be adapted to selectively pass signals below a certain pre-determined frequency while attenuating signals greater than the pre-determined frequency.

In operation, the RF signal, which may have a RF carrier frequency of $f_{RF}$, may be received by an antenna and communicated to the amplifier 310, and may be amplified by the amplifier 310. The amplified RF signal may be communicated to an input of the mixer 312. The output signal of the RF LO 314, which may have a frequency of $f_{LO}=f_{RF}+f_{IF}$ or $f_{LO}=f_{RF}-f_{IF}$, may be communicated to another input of the mixer 312, where frequency $f_{IF}$ may be the desired intermediate frequency. The mixer 312 may process the two input signals such that the output signal may comprise frequencies, which may be a sum and/or difference of frequencies of the two input signal. The mixer 312 output signal may be referred to as a VLIF signal.

The VLIF signal may be communicated to a bandpass filter 316 such that the bandpass filter 316 may pass the desired bandwidth of signals, while attenuating undesired frequencies in the VLIF signal. The filtered VLIF signal may be communicated to the amplifier 318 where the filtered VLIF signal may be amplified by the amplifier 318. The amplified VLIF signal, which may comprise a bandwidth of signals about the VLIF frequency $f_{IF}$, may be an input to the mixer 320. The VLIF LO 322 may have as an output a signal whose frequency may be $f_{IF}$, and this signal may be communicated to another input of the mixer 320. The mixer 320 may process the two input signals such that the output signal may have a frequency that may be a sum and/or difference of the frequencies of the two input signals. The output signal of the mixer 320 may be referred to as an unfiltered baseband signal.

The unfiltered baseband signal may be communicated to a lowpass filter 324 such that the lowpass filter 324 may pass the desired frequencies in the baseband signal, while attenuating undesired frequencies. The output of the lowpass filter 324 may be the analog baseband signal output of the receiver front end 152 (FIG. 1b).

An advantage of the exemplary RF receiver front end illustrated in FIG. 3, which may be utilized to extract a baseband signal from an RF signal, in accordance with an embodiment of the invention, may be cost savings compared to a design that may use a digital IF processor 220, for example, as illustrated in FIG. 2. The digital IF processor 220 may be a separate chip, which may have additional costs associated with it. Some factors in the additional cost may be the cost of the chip, the additional board space needed for the chip, additional complexities during manufacturing, and additional testing required at board level.

Figure 4:
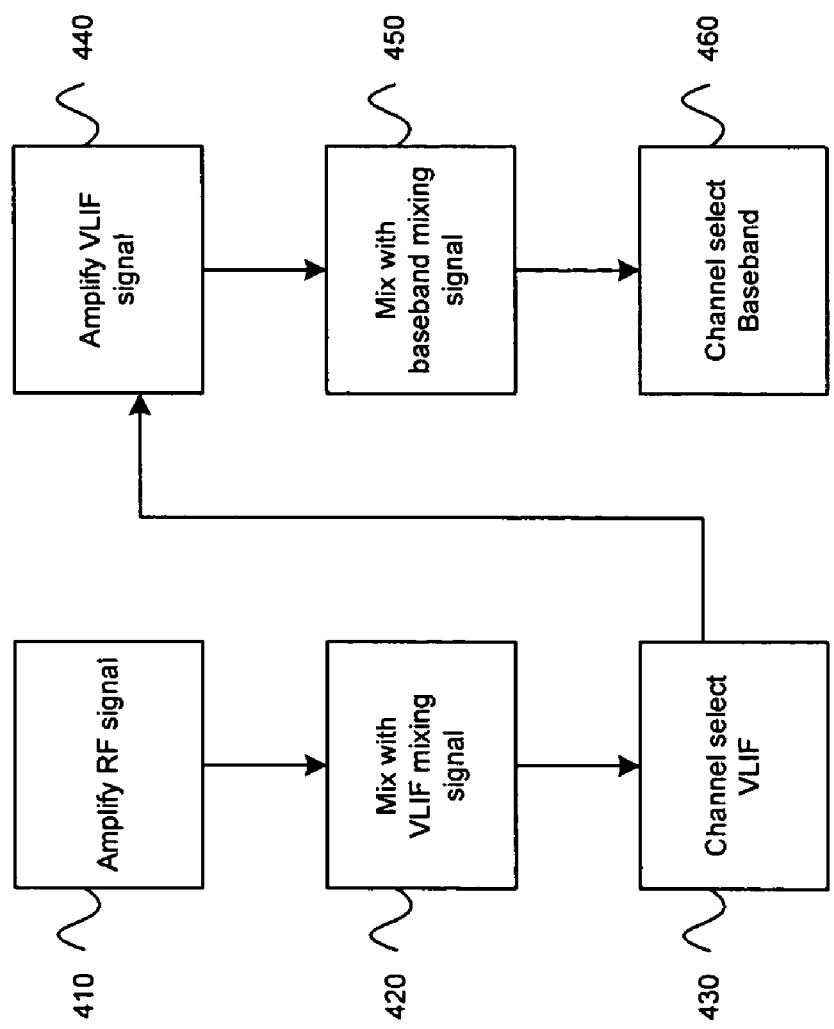
FIG. 4 is an exemplary flow diagram of the baseband signal extraction from the RF signal, in accordance with an embodiment of the invention.

FIG. 4 is an exemplary flow diagram of the baseband signal extraction from the RF signal, in accordance with an embodiment of the invention. Referring to FIG. 4, there is shown a plurality of steps 410 to 460 which may be the steps to demodulate a received RF signal to a baseband signal. Step 410 may amplify the received RF signal. Step 420 may mix the amplified RF signal with a VLIF mixing signal to generate an upper sideband and a lower sideband at VLIF frequencies. Step 430 may bandpass filter VLIF sidebands from step 420 to remove a sideband. Step 440 may amplify a VLIF signal from step 430. Step 450 may mix the VLIF signal with a baseband mixing signal to generate an upper sideband and a lower sideband at baseband frequencies. Step 460 may lowpass filter baseband sidebands from step 450 to remove the upper sideband. The remaining lower sideband may be a baseband signal starting at 0 Hz (DC).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating a baseband signal, the method comprising:
   downconverting, in an analog domain, a radio frequency (RF) signal to a very low intermediate frequency (VLIF) signal utilizing a mixer;
   downconverting, in an analog domain, said VLIF signal to a baseband signal utilizing a harmonic-reject mixer, wherein said harmonic-reject mixer removes odd harmonics from said baseband signal;
   amplifying said RF signal with a first amplifier;
   utilizing a first local oscillator circuit to generate a first local oscillator signal that is an input to said mixer, wherein said amplified RF signal is also an input to said mixer, and wherein said VLIF signal is an output of said mixer; and
   filtering said VLIF signal with a bandpass filter to attenuate undesired signals from said VLIF signal.

2. The method according to claim 1, wherein said first amplifier is a fixed gain amplifier.

3. The method according to claim 1, wherein said first amplifier is a variable gain amplifier.

4. The method according to claim 1, wherein said first local oscillator circuit outputs said VLIF oscillator signal with a fixed frequency.

5. The method according to claim 1, wherein said first local oscillator circuit is a programmable VLIF oscillator circuit where said first local oscillator signal is one of a plurality of frequencies.

6. The method according to claim 1, comprising amplifying said bandpass filtered VLIF signal with a second amplifier.

7. The method according to claim 6, wherein said second amplifier is a fixed gain amplifier.

8. The method according to claim 6, wherein said second amplifier is a variable gain amplifier.

9. The method according to claim 1, comprising utilizing a second local oscillator circuit to generate a second local oscillator signal that is an input to said harmonic-reject mixer, wherein said amplified VLIF signal is also an input to said harmonic-reject mixer, and an unfiltered baseband signal is an output of said harmonic-reject mixer.

10. The method according to claim 9, wherein said second local oscillator circuit outputs said second local oscillator signal with a fixed frequency.

11. The method according to claim 9, wherein said second local oscillator circuit is a programmable local oscillator where said second local oscillator signal comprises one of a plurality of frequencies.

12. The method according to claim 9, wherein said unfiltered baseband signal is filtered by a lowpass filter, such that an output of said lowpass filter is said baseband signal.

13. A system for generating a baseband signal, the system comprising:
- a mixer to downconvert, in an analog domain, a radio frequency (RF) signal to a very low intermediate frequency (VLIF) signal;
- a harmonic-reject mixer to downconvert, in an analog domain, said VLIF signal to a baseband signal, wherein said harmonic-reject mixer removes odd harmonics from said baseband signal;
- a first amplifier that amplifies said RF signal;
- a first local oscillator circuit that generates a first local oscillator signal that is an input to said mixer, wherein said amplified RF signal is also an input to said mixer, and wherein said VLIF signal is an output of said mixer; and
- a bandpass filter that filters said VLIF signal to attenuate undesired signals from said VLIF signal.

14. The system according to claim 13, wherein said first amplifier is a fixed gain amplifier.

15. The system according to claim 13, wherein said first amplifier is a variable gain amplifier.

16. The system according to claim 13, wherein said first local oscillator circuit outputs said first local oscillator signal with a fixed frequency.

17. The system according to claim 13, wherein said first local oscillator circuit is a programmable local oscillator circuit and said first local oscillator signal comprises one of a plurality of frequencies.

18. The system according to claim 13, comprising a second amplifier that amplifies said bandpass filtered VLIF signal.

19. The system according to claim 18, wherein said second amplifier is a fixed gain amplifier.

20. The system according to claim 18, wherein said second amplifier is a variable gain amplifier.

21. The system according to claim 18, comprising a second local oscillator circuit that generates a second local oscillator signal that is an input to said harmonic-reject mixer, wherein said amplified VLIF signal is also an input to said harmonic-reject mixer, and an unfiltered baseband signal is an output of said harmonic-reject mixer.

22. The system according to claim 21, wherein said second local oscillator circuit outputs said second local oscillator signal with a fixed frequency.

23. The system according to claim 21, wherein said second local oscillator circuit is a programmable local oscillator and said second local oscillator signal comprises one of a plurality of frequencies.

24. The method according to claim 21, wherein said unfiltered baseband signal is filtered by a lowpass filter, and an output of said lowpass filter is said baseband signal.

* * * * *